July 29, 1924.  
F. MÜLLER  
MILLING CUTTER  
Filed Dec. 24, 1921    3 Sheets-Sheet 1

1,503,000

Inventor  
Friederich Müller,  
By Wayne B Wells  
Attorney

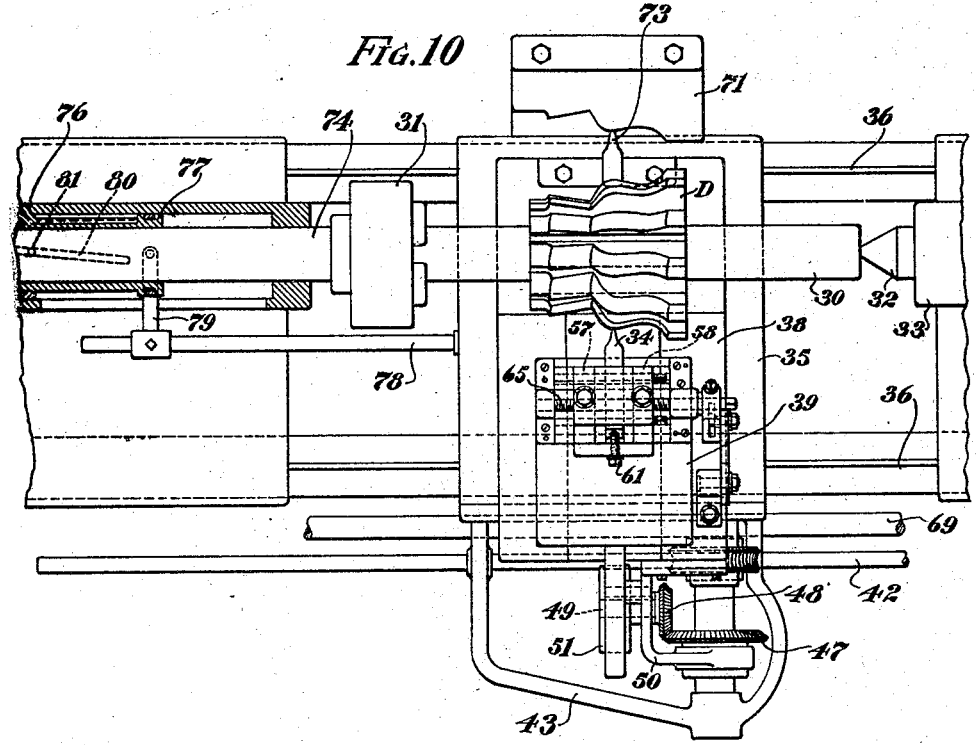
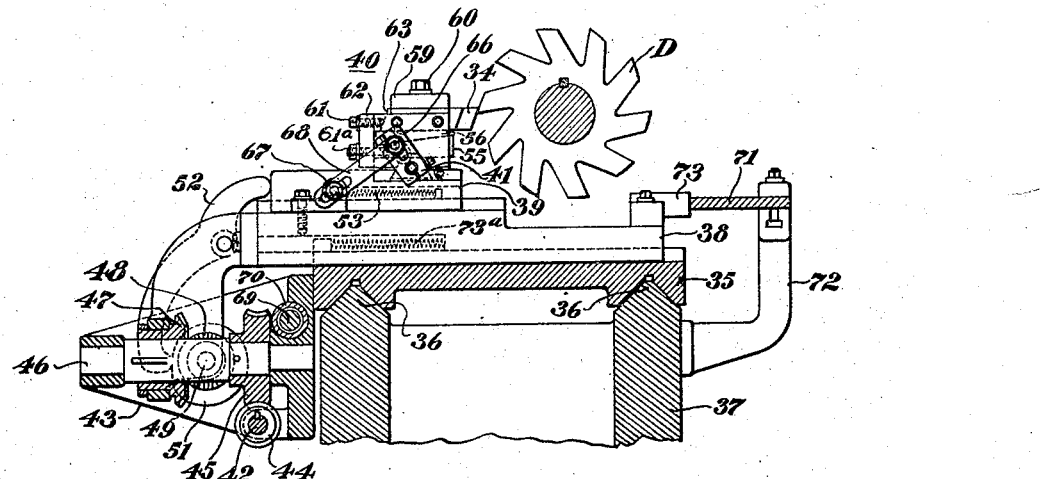

Patented July 29, 1924.

1,503,000

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MILLING CUTTER.

Application filed December 24, 1921. Serial No. 524,586.

*To all whom it may concern:*

Be it known that I, FRIEDERICH MÜLLER, a citizen of the United States, residing at Hartford, in the county of Hartford and State of Connecticut, have invented certain new and useful Improvements in a Milling Cutter, of which the following is a specification.

My invention relates to milling cutters and particularly to milling cutters which are adapted to cut irregular or non-rectilinear contours.

One object of my invention is to provide a milling cutter for cutting a predetermined irregular contour that shall have the cutting faces of the teeth thereon shaped with a contour different from the predetermined contour to be cut by them and that shall have the teeth relieved along lines extending backward, inward and to the right or left from the front cutting edges.

Another object of my invention is to provide a milling cutter of the above indicated type that shall have the teeth thereof extending longitudinally along the cutter and inclined with respect to the cutter axis and that shall have the teeth so relieved along lines extending backward, inward and to the right or left as to permit the grinding of the front cutting faces of the cutter teeth without changing the contour cut thereby.

A further object of my invention is to provide a milling cutter for cutting an irregular contour that shall have helical teeth provided with non-radially arranged cutting faces and that shall have the teeth so relieved along lines extending backward, inward and to the right or left as to permit the grinding of the front cutting faces of the cutter teeth without changing the contour cut thereby.

In the art of cutting metals by means of milling cutters, it is preferable in most cases and particularly, if the contour is of appreciable length, to have helical cutting faces on the teeth of the cutter. Moreover, it is preferable for many classes of work to undercut the cutting faces of the teeth and thus provide a sharper cutting edge. In my application Serial No. 323,110 filed September 11th, 1919, is claimed and described a milling cutter of the above indicated type having teeth provided with non-radially arranged cutting faces. Trouble is sometimes experienced if the contour to be cut by a milling cutter has portions thereof which are extremely steep so that a milling cutter adapted to cut such contour would have portions of its contour making an angle of less than 5° with a line perpendicular to the cutter axis.

In accordance with my present invention, the teeth of the milling cutter are relieved along lines extending backward, inward and to the right or left from the front cutting edges so that milling cutters with contours having portions thereof making an angle of less than 5° with lines perpendicular to the cutter axis may be conveniently operated. The milling cutters embodying my invention may be provided with helical or straight teeth having radially or nonradially arranged cutting faces. Milling cutters embodying my invention may be shaped by the machines disclosed in my application Serial No. 522,304, filed December 14, 1921, and by the methods disclosed in my invention Serial No. 522,303 filed December 14, 1921.

In the accompanying drawings:

Fig. 10 is a diagrammatic plan view of a relieving machine adapted to shape milling cutters.

Fig. 11 is a sectional view along line 11—11 of the machine shown in Fig. 10.

Figure 1:
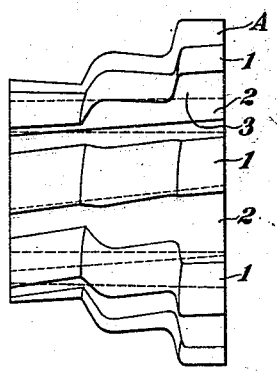
Figure 1 is a front elevational view of a milling cutter provided with helical teeth relieved in accordance with my invention and having undercut cutting faces.
Figure 2:
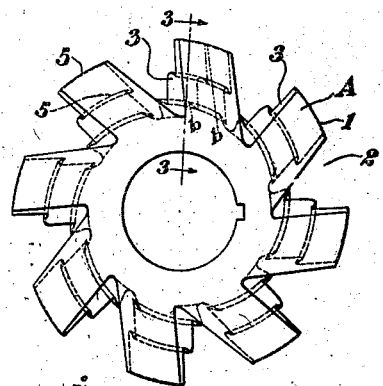
Fig. 2 is an end elevational view of the milling cutter shown in Fig. 1.
Figure 3:
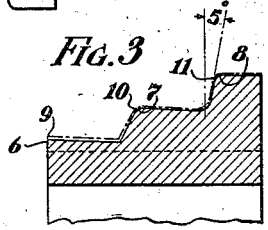
Fig. 3 is a sectional view along the line 3—3 of the milling cutter shown in Fig. 2.

Referring to Figs. 1, 2 and 3 of the drawings, a milling cutter A is illustrated having helical undercut teeth which are relieved along lines extending backward, inward and to the right. The cutter is adapted to cut an irregular contour differing from a straight line and has a portion thereof which makes an angle of less than 5° with a line perpendicular to the cutter axis, as shown in Fig. 3. The cutter is provided with a plurality of generally longitudinal teeth 1 between which are grooves 2, the teeth and groves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is non-radial, being inclined backward in order to provide an improved cutting angle. Preferably, each tooth 1 is generally helical in form and each cutting face 3 conforms to a helicoid. As illustrated, the helicoid is one formed by a generatrix following a helix on a small cylinder concentric with the cutter axis and also following a helix on a much larger cylinder also concentric with the axis. The teeth and the cutting faces may be inclined in either direction with respect to the axis and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. My invention is particularly related to cutters adapted to cut a contour which requires the cutter to have a portion thereof make an angle of 5° or less with a line perpendicular to the cutter axis. When a portion of the contour surface of a cutter makes an angle of 5° or less with a line perpendicular to the cutter axis, the usual radial relief, which follows lines extending backward and inward, will not suffice to prevent the cutter from binding on the work. The teeth on the cutter must be relieved along lines which extend backward, inward and to the right or left. My invention is particularly adapted to milling cutters having all inclined faces facing in one direction. The relief lines extend to the right or left from the front cutting edge of each tooth according to the facing of inclined faces on the teeth. It is common practice at the present time to form milling cutters having straight flutes and inclined faces facing in opposite directions. Such cutters from necessity must be made in two pieces in order that they may be conveniently ground. Cutters formed in accordance with my invention may also be assembled in two pieces in a like manner to the cutters now in use. It will be understood that the particular contour adapted to be cut by the milling cutter shown in Figs. 1 and 2 has been selected merely by way of example and that the contour can vary in any practical way that may be desired.

The outer edge of each cutting face 3 has an outline which is adapted to cut the predetermined contour when the cutter is rotated, the outline of the cutting face following the helicoidal surface thereof. The effective contour of the cutter shown in Figs. 1 and 2 or the contour to be cut by such cutter is indicated by the dot and dash lines in Fig. 3 of the drawings.

Each tooth of the cutter is relieved along lines 5 which extend backward, inward and to the right from the outline of the non-radial cutting face. The relief lines form a continuous surface or continuous surfaces which extend from end to end of the cutter. The relief lines are properly constructed notwithstanding the variations in radius at different points along the said outline and notwithstanding the variations in angular position resulting from the non-radial warped or helicoidal cutting face of each tooth. Preferably the relief lines 5 are maintained in similar relationship to each other as they extend backward, inward and to the right. The result is that each tooth of the cutter, at any axial plane of intersection, such as 3—3, Fig. 2 has a distorted shape, as shown by full lines in Fig. 3. The distortion of shape results from the fact that the successive inward inclined relief lines 5 start at different angular positions because of the non-radial helicoidal cutting face. Moreover, the side relief, which is applied to the teeth of the cutter, causes the contour shown by full lines to be moved toward the right as compared to the effective contour indicated by the dot and dash lines. Therefore, with the cutting face inclined in the direction indicated, the several points 6, 7 and 8, on the full line are shown inward and to the right of similar points 9, 10 and 11 on the dot and dash line. The distance between points on the dot and dash line and on the full line progressively increases towards the left as shown in Fig. 3. Notwithstanding this distortion in shape at an axial plane of intersection, the outline or effective contour at the cutting face is correct, as before stated. The contours shown in Fig. 3 by the full lines and by the dot and dash lines are shown to diverge as they extend toward the left. Such divergence of the lines representing the two contours is exaggerated for illustrative purposes and is chiefly caused by the inclination of the cutter teeth. The longer the cutter the greater would be the distance on the left of Fig. 3 between the lines representing the two contours. The undercut which is applied to the teeth of the cutter serves to cause a greater distance between the two contours represented in Fig. 3 by dot and dash lines and by full lines at the greater diameters thereof. Thus, the undercut, which is applied to the cutter teeth, would tend to separate the dot and dash lines and the full lines toward the right of Fig. 3. However, as shown in Fig. 3 the inclination of the cutter teeth causes a greater separation between the two sets of lines representing the two contours.

When the relief lines 9 conform to spirals and are maintained in similar relationship as they extend backward, inward and to the right, as is preferred, it is possible to sharpen or grind the teeth of the cutter on the front cutting faces 3 without changing the effective contour. The teeth present the same effective contour at successive non-radial helicoidal surfaces of intersection similar in form and position to the initial cutting faces 3. At any surface, such as $bb$, back of an initial cutting face 3 and similar to the said face, the same effective contour will be found. Therefore if the teeth are ground on their front faces to non-radial helicoids which are the same as the non-radial helicoids of the initial cutting faces, the effective contour will remain the same.

Figure 4:
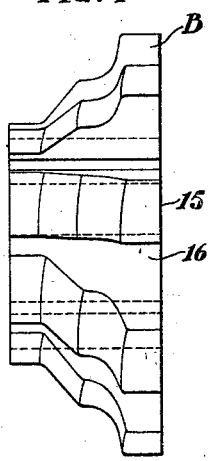
Fig. 4 is a front elevational view of a milling cutter provided with straight teeth relieved in accordance with my invention and having undercut cutting faces.
Figure 5:
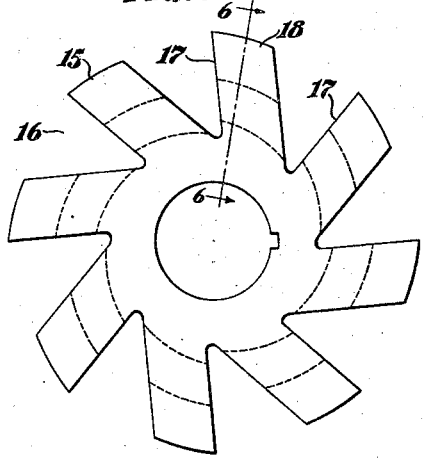
Fig. 5 is a side elevational view of the milling cutter shown in Fig. 4.
Figure 6:
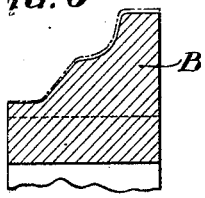
Fig. 6 is a sectional view along the line 6—6 of the milling cutter shown in Fig. 4.

Referring to Figs. 4, 5 and 6 of the drawings, a cutter is shown having straight undercut teeth which are relieved along lines extending backward, inward and to the right from the front cutting edge. The milling cutter is adapted to cut a contour differing from a straight line and has a portion thereof, as shown in Fig. 6, which makes an angle of 5° or less with a line perpendicular to the cutter axis. A plurality of generally longitudinal teeth 15 are provided and between which are grooves 16, the teeth and grooves being preferably spaced uniformly. The grooves between the teeth can be of any usual or preferred depth and shape, as required by the spacing and by the depth of the contour to be cut. The front wall 17 of each tooth 15 constitutes the cutting face thereof and such cutting face is non-radial, being inclined backward in order to provide an improved cutting angle. The cutting faces and also the teeth on the cutter B are parallel to the axis thereof.

The cutter B is similar to the cutter A except for the inclination of the teeth thereof and may be made for cutting any desired practical contour. The contour may be made up of a series of straight lines or a series of circular arcs, or a combination of circular arcs and straight lines, or the contour may consist in whole or in part of non-circular curves. The milling cutter shown in Figs. 4 and 5 is adapted for cutting the contour shown by dot and dash lines in Fig. 6. The grooves 16 can be of any usual or preferred depth or shape as required by the spacing and by the depth of the contour.

The outer edge of each cutting face 17 has an outline which is shaped to cut the predetermined contour when the cutter is rotated. Each tooth of the milling cutter B is relieved along lines 18 extending backward, inward and to the right from the front cutting edge of the tooth. The relief lines form a continuous surface or continuous surfaces which extend from end to end of the cutter and which are properly constructed notwithstanding the variations in radius at different points along the said outline and notwithstanding the variations in angular position resulting from the non-radial cutting face. Preferably the relief lines 18 are maintained in similar relationship to each other as they extend backward, inward and to the right, the lines preferably conforming to spirals. The result is that each tooth of the cutter, at any axial plane of intersection, has a distorted shape, the distortion of shape resulting from the fact that the successive inward inclined relief lines 18 start at different angular positions because the cutting face is non-radial. Notwithstanding this distortion in shape at axial planes of intersection, the outline or effective contour at the cutting face is correct, as before stated.

When the relief lines 18 conform to spirals and are maintained in similar relationship as they extend backward, inward and to the right, as is preferred, it is possible to sharpen or grind the teeth of the cutter on the front cutting faces 17 without changing the effective contour. The teeth present the same effective contour at successive inclined surfaces of intersection similar in form and position to the initial cutting faces 17. At any surface back of an initial cutting face 17 and similar to the said face, the same effective contour will be found. The milling cutter A differs from the milling cutter B by reason of the cutter A having helical teeth and the cutter B having straight teeth.

A section along the radial line 6—6 in Fig. 5 is shown by full lines in Fig. 6. The effective contour of the cutter is indicated by dot and dash lines in Fig. 6 of the drawings. It will be noted that the two sets of lines in Fig. 6, which indicate the two contours, diverge towards the right of the figure. The divergence between the two sets of lines is somewhat exaggerated for illustrative purposes and is caused by the undercut on the teeth. The difference between the sets of contour lines in Fig. 3 and Fig. 6 is apparent when it is noted the cutter A has helical teeth whereas the cutter B has straight teeth.

Figure 7:
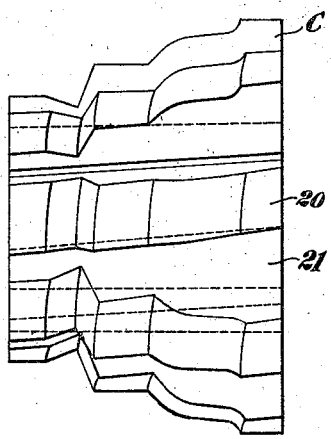
Fig. 7 is a front elevational view of a milling cutter provided with helical teeth relieved in accordance with my invention and having radially arranged cutting faces.
Figure 8:
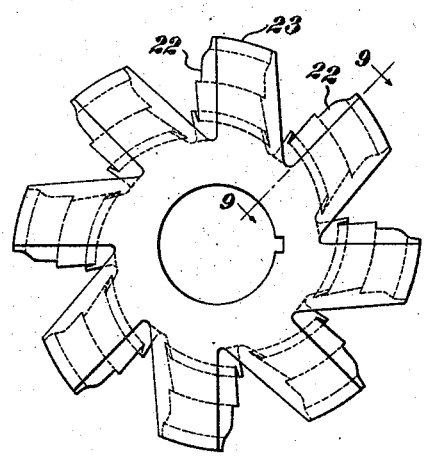
Fig. 8 is an end elevational view of the milling cutter shown in Fig. 7.
Figure 9:
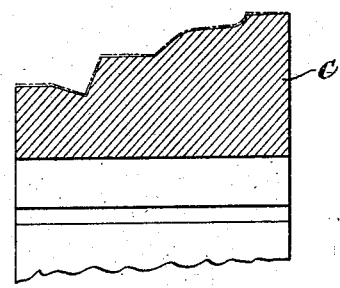
Fig. 9 is a sectional view along the line 9—9 of the milling cutter shown in Fig. 8.

Referring to Figs. 7, 8 and 9 of the drawings, a milling cutter C is shown which is adapted to cut a predetermined contour differing from a straight line. The cutter C is provided with a plurality of generally longitudinal teeth 20 between which are grooves 21, the teeth and the grooves being preferably spaced uniformly. The grooves 21 between the teeth can be of any usual or preferred depth and shape, as required by the spacing and by the depth of the contour to be cut. The front wall 22 of each tooth 20 constitutes the cutting face thereof and such cutting face is radially arranged. The cutting faces are preferably in planes inclined with respect to the cutter axis. Preferably the entire teeth 20 are oblique or inclined, and not merely the front cutting faces 22 thereof, and each tooth is generally helical in form and each cutting face conforms to a helicoid. The teeth and the cutting faces may be inclined in either direction with respect to the axis and the degree of inclination may be varied as required.

The cutter C may be made for cutting any desired practical contour. The contour may be made up of a series of straight lines or a series of circular arcs or a combination of circular arcs and straight lines or the contour may consist in whole or in part of noncircular curves. The cutter shown in Figs. 7 and 8 is adapted to cut the contour shown in dot and dash lines in Fig. 8 of the drawings. The grooves 21 between the teeth 20 can be made of any usual or preferred depth or shape as required by the spacing and depth of the contour. As illustrated in Fig. 9 of the drawings, each groove 21 has a uniform depth throughout, that is, its bottom is of a uniform distance from the axis of the cutter.

The outer edge of each cutting face 22 has an outline which is shaped to cut the predetermined contour when the cutter is rotated. This outline of the cutting face following the radial and preferably helicoidal surface thereof. All points along the outline must be at their respective correct distances from the center so that when the cutter is rotated they will cut the correct predetermined contour. This relationship obtains notwithstanding the fact that the cutting face of each tooth is warped or helicoidal as shown.

Each tooth of the milling cutter C is relieved along lines 23 extending backward, inward and to the right from the front cutting edge thereof. The relief lines form a continuous surface or continuous surfaces which extend from end to end of the cutter and which are properly constructed notwithstanding the variations in radius at different points along the outline and notwithstanding the variations in angular position because of the helicoidal cutting face. Preferably the relief lines 29 are maintained in similar relationship to each other as they extend backward, inward and to the right. The result is that each tooth of the cutter at any axial plane of intersection has a distorted shape, the distortion of shape resulting from the fact that the successive inclined relief lines start at different angular positions because the cutting face is helicoidal in shape. Notwithstanding this distortion of shape at axial planes of intersection, the outline or effective contour at the cutting face is correct, as before stated.

The relief lines 23 conform to spirals and are maintained in similar relationship as they extend backward, inward and to the right as is preferred. Accordingly it is possible to sharpen or grind the teeth of the cutter on the front cutting faces 22 without changing the effective contour. The teeth present the same respective contour at successive inclined surfaces of intersection similar in form and position to the initial cutting face 22. At any surface back of an initial cutting face 22 and similar to the said face the same effective contour will be found. Therefore, if the cutter is ground on the front faces to helicoids which are the same as the helicoids of the initial cutting faces the effective contour will remain the same.

The milling cutter C disclosed in Figs. 7 and 8 differs principally from the milling cutter A shown in Figs. 1 and 2 by having its cutting faces radially arranged in place of non-radially arranged as the cutting faces are arranged in the cutter shown in Figs. 1 and 2. The full lines in Fig. 9 represent a section along the lines 9—9 in Fig. 8 of the drawings. The effective contour which is cut by the cutter is indicated by the dot and dash lines as heretofore set forth. In comparing the dot and dash line with the full lines in Fig. 9 of the drawings, it will be understood that such lines diverge towards the left in a manner similar to the dot and dash lines and the full lines shown in Fig. 3 of the drawings. Such variation between the effective contour of the cutter and the contour along a radial section is caused by the helical shape of the teeth.

Referring to the Figs. 10 and 11 of the drawings, a machine is diagrammatically illustrated which is adapted to shape any of the milling cutters heretofore described. Preferably, the milling cutters are shaped in the machine disclosed in my copending application Serial No. 522,304 filed December 14, 1921, and in accordance with the methods described in my application Serial No. 522,303 filed December 14, 1921. The machine disclosed in Figs. 10 and 11 is adapted to shape milling cutters provided with teeth which are either straight or helical and having radial or non-radially arranged cutting faces. The teeth in all cases are relieved along lines extending backward, inward and to the right or left.

In Figs. 10 and 11 of the drawings, a cutter blank D is shown mounted on a mandrel 30. The mandrel 30 is supported by a chuck 31 and a center pin 32. The center pin 32 is mounted in a tailstock 33. A cutting tool 34 which is adapted to engage the cutter blank D is mounted on a carriage 35. The carriage 35 is movable along ways 36 on the frame 37 of the machine. A transversely movable slide 38 is directly mounted on the carriage 35. The slide 38 serves to vary the position of the cutting tool 34 in a manner to be hereinafter set forth to cut the blank to different diameters. A relieving slide 39 is mounted on the slide 38 and a tool post 40 is mounted on the relieving slide 39. A side relieving slide 41, which is adapted to move in a guideway formed on the relieving slide 39 is movable in the direction perpendicular to the direction of movement of the relieving slide. Such side relieving slide directly carries the tool post 40.

A suitable mechanism is mounted on the carriage 35 and the slide 38 for effecting relieving movements of the relieving slide 39 in timed relation to the rotation of the blank D. A shaft 42, which extends longitudinally along the machine, is provided with bearings in a bracket 43. The bracket 43 projects from the carriage 35. The shaft 42 is driven in timed relation to the spindle rotation in any suitable manner in order to effect relieving movements of the tool in accordance with the blank rotation. A worm member 44 is keyed to, but slidably mounted on, the shaft 42 in order to rotate in accordance with the rotation of the shaft 42 and to effect longitudinal movement in accordance with the movement of the carriage 35. The worm member 44 meshes with a worm wheel 45 which is mounted on a short shaft 46. The shaft 46 is mounted on the bracket 43 which is supported by the carriage 35. A bevel gear wheel 47, which is slidably mounted on the shaft 46, meshes with a bevel gear wheel 48. The gear wheel 48 is mounted on a short shaft 49. The shaft 49 is provided with a bearing in the bracket 50 which projects from the slide 38. The bracket 50 engages a hub portion of the bevel gear wheel 47 in order to effect movement of such gear wheel along the shaft 46 in accordance with the movement of the slide 38. The bevel gear wheel 47 is splined to the shaft 46 in order to rotate in accordance with the rotation of the shaft 42. The shaft 49 carries a cam member 51 which is adapted to oscillate a lever 52. The lever 52 is pivotally mounted in any suitable manner on the slide 38 with the upper end thereof engaging the relieving slide 39. A spring member 53 is provided for holding the relieving slide 39 in engagement with the lever 52. In the above construction, it is apparent the rotation of the cam member 51 oscillates the lever 52 to effect relieving movements of the slide 39 and the cutting tool 34. The shaft 42 is driven in timed relation with the cutter blank so that normally at any given position of the carriage the cam member 51 is given as many complete rotations for each rotation of the blank as the blank has teeth.

The cutting tool 34 is mounted on wedge members 55 and 56 between the side walls 57 and 58 of the tool post 40. The wedge members 55 and 56 serve to adjust the cutting tool 34 into engagement with a bar 59. The bar 59 is secured to the top of the side walls 57 and 58 by means of suitable bolts 60. Two screws 61 and 61$^a$, which are mounted on the face plate 62, are secured to the front of the tool post. The screw 61$^a$ is suitably connected to the wedge member 55 and serves to operate the wedge member for forcing the cutting tool into engagement with the bar 59. The screw 61 adjusts the horizontal position of the tool 34. The position of the bar 59 serves to determine the cutting plane of the tool 34 relative to an axial plane through the cutter blank B. Preferably the tool post is so constructed that the cutting tool will operate in an axial plane when the bar 59 is mounted directly on the side walls 57 and 58. When it is desired to operate the cutting tool above the axial plane, suitable liners 63 are positioned between the side walls 57 and 58 and the bar 59. The cutting plane of the cutting tool is moved above the axial plane in accordance with the method set forth in the application of Ernest Wildhaber Serial No. 517,753 filed November 25, 1921.

The raising of the cutting plane serves to compensate the relieving operation for non-radial cutting faces. If a cutter blank is to be operated on which has radially arranged cutting faces then no liners 63 are positioned in the tool post for elevating the cutting plane of the tool above the axial plane. However, if the blank is provided with undercut or non-radially arranged cutting faces then it is necessary to elevate the tool in accordance with the method disclosed in the above mentioned application of Ernest Wildhaber. The relieving operation may also be compensated in accordance with the method disclosed in my application Serial No. 522,303 above referred to.

A screw shaft 65, which is suitably mounted in bearings on the relieving slide 39, is connected to the side relieving shaft 41 by means of any suitable nut not shown. A lever arm 66 is mounted on the screw shaft 65 and such lever arm is connected to a bolt 67 by means of a link 68. The bolt 67 is fixedly mounted, in any suitable manner, upon the carriage 38. Any suitable means may be provided for adjusting the position not only of the link 68 but also of the lever 66. In the above construction, it is apparent the relieving movements of the slide 39 serve to effect rotative movement of the screw shaft 65, such rotative movement of the shaft 65 serves to effect a side relieving movement of the cutting tool 34. For a more complete description of the mechanism for effecting the side relieving movements, reference may be had in my application Serial No. 522,304 above referred to.

A screw shaft 69 is provided for effecting feeding operation of the carriage 35 in any suitable manner. Preferably a nut 70, which is connected to the bracket 43, is engaged by the shaft 69 to effect movement of the carriage. The shaft 69 may be operated in any suitable manner by the mechanism which effects operation of the cutter blank and the shaft 42. If so desired, the carriage may be fed intermittently in the manner disclosed in my application Serial No. 286,524 filed May 31, 1919.

A former member 71, which is mounted on a bracket 72 projecting from the frame 37 of the machine, is provided with a contour similar to the contour that is to be cut by the finished blank. The former member 71 is engaged by a former pin 73 which is suitably mounted on the slide 38. The engagement between the former member 71 and the former pin 73 serves to determine the diameter to be cut on the blank D by the cutting tool 34. A spring member 73ª is provided for holding the pin 73 in engagement with the former member.

In order to effect relieving movements of the cutting tool 34 in accordance with helicodial cutting faces on the blank D provision is made for supplementally rotating the blank in proportion to the longitudinal movement of the tool. In the illustrated construction, the chuck 31, which engages the mandrel 30, is mounted on a spindle 74. Power for rotating the spindle 74 is supplied through a sleeve 76 which has splined engagement with a smaller sleeve 77. A rod 78 and a forked lever 79 are provided for forcing the sleeve 77 to move longitudinally with the carriage 35. The spindle 74 is fixed against longitudinal movement and extends into the sleeve 77. The sleeve 77 is provided with a helical groove 80 having the same longitudinal pitch as the helical cutting faces of the blank. A pin 81 on the spindle 74 projects into the groove 80 thus transmitting power from the sleeve 77 to the spindle. It will be seen that the above construction permits the spindle to be driven by means of the sleeve 76 but that the spindle is supplementally rotated in proportion to the longitudinal movement of the carriage. This supplemental movement is just sufficient to enable the tool to properly engage the helicoidal teeth. In case the teeth of the blank are not inclined relative to the blank axis, the groove 80 in the sleeve 77 will be varied in accordance therewith.

Modifications in the cutters and in the arrangement and shape of the teeth may be made within the spirit and scope of my invention and such modifications are intended to be covered by the appended claims.

What I claim is:

1. A milling cutter for cutting a predetermined contour other than a straight line, comprising a plurality of generally longitudinal but inclined teeth each having a cutting face provided with a contour different from the predetermined contour but adapted to cut the predetermined contour as the cutter is rotated, the outer surface of each tooth behind the front cutting face being relieved along lines extending backward, inward, and to the right or left from the front cutting edge.

2. A milling cutter for cutting a predetermined contour other than a straight line parallel to the cutter axis, comprising a plurality of generally longitudinal but inclined teeth each provided with a front cutting face having a contour different from said predetermined contour but adapted to cut the said contour as the cutter is rotated, the outer surface of each tooth behind the front cutting face being relieved along lines extending backward, inward, and to the right or the left from the front cutting edge of the face to provide an effective contour behind each cutting surface which is the same at successive surfaces of intersection similar to the initial cutting face, whereby the cutter may be ground on the front cutting faces without changing the effective contour.

3. A milling cutter for cutting a predetermined contour other than a straight line parallel to the cutter axis, comprising a plurality of generally longitudinal teeth each provided with a non-radial front cutting face having a contour different from the said predetermined contour but adapted to cut the said contour as the cutter is rotated, the outer surface of each tooth behind the non-radial cutting face being relieved along lines extending backward, inward and to the right or left from the front cutting edge.

4. A milling cutter for cutting a predetermined contour other than a straight line parallel to the cutter axis, comprising a plurality of generally longitudinal but inclined teeth, each provided with a non-radial front cutting face having a contour different from the said predetermined contour but adapted to cut the said contour as the cutter is rotated, the outer surface of each tooth behind the front cutting face being relieved along lines extending backward, inward and to the right or the left from the front cutting edge and conforming to spirals constructed about the cutter axis.

5. A milling cutter for cutting a predetermined contour other than a straight line, comprising a plurality of generally longitudinal teeth each provided with a non-radial front cutting face having a contour different from the said predetermined contour but adapted to cut the said contour as the cutter is rotated, the outer surface of each tooth behind the non-radial cutting face being relieved along lines extending backward, inward and to the right or the left from the front cutting edge of the face to provide an effective contour behind each cutting face which is the same at successive surfaces of intersection similar to the initial cutting face, whereby the cutter may be ground on the non-radial cutting faces without changing the effective contour.

6. A milling cutter for cutting a predetermined contour other than a straight line, comprising a plurality of generally longitudinal but inclined teeth each having a cutting face provided with a contour different from the predetermined contour but adapted to cut the predetermined contour as the cutter is rotated, the contour on each cutting face having a portion thereof which makes an angle of less than 5° with a line perpendicular to the cutter axis, the outer surface of each tooth behind the front cutting face being relieved along lines extending backward, inward, and to the right or left from the front cutting edge.

7. A milling cutter for cutting a predetermined contour other than a straight line, comprising a plurality of generally longitudinal teeth each provided with a non-radial front cutting face having a contour different from the said predetermined contour but adapted to cut the said contour as the cutter is rotated, the contour on each cutting face having a portion thereof which makes an angle of less than 5° with a plane perpendicular to the cutter axis, the outer surface of each tooth behind the non-radial cutting face being relieved along lines extending backward, inward and to the right or left from the front cutting edge.

8. A milling cutter for cutting a predetermined contour other than a straight line, comprising a plurality of generally longitudinal but inclined teeth, each provided with a non-radial front cutting face having a contour different from the said predetermined contour but adapted to cut the said contour as the cutter is rotated, the contour on the cutting faces of the teeth having a portion thereof which makes a small angle with a plane perpendicular to the cutter axis, the outer surface of each tooth behind the front cutting face being relieved along lines extending backward, inward, and to the right or the left from the front cutting edge and conforming to spirals constructed about the cutter axis.

9. A milling cutter for cutting a predetermined contour consisting in part of curved portions, comprising a plurality of generally longitudinal but inclined teeth each having a cutting face provided with a contour different from the predetermined contour but adapted to cut the predetermined contour as the cutter is rotated, the contour on the cutting faces of the teeth having a portion thereof which makes a small angle with a line perpendicular to the cutter axis, the outer surface of each tooth behind the front cutting face being relieved along lines extending backward, inward, and to the right or left from the front cutting edge.

In testimony whereof, I hereto affix my signature.

FRIEDERICH MÜLLER.